United States Patent
Yi

(10) Patent No.: US 11,021,170 B2
(45) Date of Patent: Jun. 1, 2021

(54) APPARATUS, SYSTEM AND METHOD FOR MANAGING DROWSY DRIVING

(71) Applicants: HYUNDAI MOTOR COMPANY, Seoul (KR); KIA MOTORS CORPORATION, Seoul (KR)

(72) Inventor: Tae Youb Yi, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 246 days.

(21) Appl. No.: 16/421,462

(22) Filed: May 23, 2019

(65) Prior Publication Data
US 2020/0164894 A1  May 28, 2020

(30) Foreign Application Priority Data
Nov. 28, 2018 (KR) .......................... 10-2018-0149670

(51) Int. Cl.
| B60W 50/08 | (2020.01) |
| B60Q 9/00 | (2006.01) |
| B60W 30/18 | (2012.01) |
| B60W 40/08 | (2012.01) |
| E05F 15/70 | (2015.01) |
| B60W 50/14 | (2020.01) |
| B60C 9/00 | (2006.01) |

(52) U.S. Cl.
CPC ............... *B60W 50/08* (2013.01); *B60C 9/00* (2013.01); *B60W 30/18* (2013.01); *B60W 40/08* (2013.01); *B60W 50/14* (2013.01); *E05F 15/70* (2015.01); *B60W 2040/0827* (2013.01); *B60W 2540/26* (2013.01); *B60W 2556/00* (2020.02); *B60W 2720/106* (2013.01); *E05Y 2900/55* (2013.01)

(58) Field of Classification Search
None
See application file for complete search history.

(56) References Cited

U.S. PATENT DOCUMENTS

| 8,698,639 | B2 * | 4/2014 | Fung ..................... | B60W 30/08 340/576 |
| 9,235,987 | B2 * | 1/2016 | Green .................... | G08B 21/02 |
| 9,848,813 | B2 * | 12/2017 | Kronberg ................ | A61B 3/113 |
| 10,796,175 | B2 * | 10/2020 | Shimizu ................. | G08B 21/06 |
| 2018/0144636 | A1 * | 5/2018 | Becker .................. | B60W 30/00 |

* cited by examiner

*Primary Examiner* — Todd Melton
(74) *Attorney, Agent, or Firm* — McDonnell Boehnen Hulbert & Berghoff LLP

(57) ABSTRACT

Disclosed are an apparatus, a system and a method for managing drowsy driving. The apparatus for managing drowsy driving includes a communication device that transmits vehicle information to a server and receives a drowsiness probability of a driver from the server, and a controller that generates a command when the drowsiness probability of the driver exceeds a reference value and determines whether the driver is in a drowsy state based on input information of the driver responding to the command.

20 Claims, 8 Drawing Sheets

APPARATUS, SYSTEM AND METHOD FOR MANAGING DROWSY DRIVING

CROSS REFERENCE TO RELATED APPLICATION

This application is claims the benefit of priority to Korean Patent Application No. 10-2018-0149670, filed in the Korean Intellectual Property Office on Nov. 28, 2018, the entire contents of which are incorporated herein by reference.

TECHNICAL FIELD

The present disclosure relates to an apparatus, a system and a method for managing drowsy driving.

BACKGROUND

Recently, various devices have been proposed to prevent drowsy driving caused due to fatigue of a driver. For example, there is a device for recognizing a driver's pupil through a camera to detect a lid-closed state, to determine drowsy driving, and to warn the driver of it.

In the case of a device for detecting drowsy driving by detecting a lid-closed state and warning the driver of the drowsy driving, based on face and eye images of the driver obtained through a camera provided in a vehicle cluster, the device determines the number of blinks of the eyes and the lid-closed state to warn of drowsy driving when the driver is drowsy. Although the device uses a scheme of determining drowsy driving and warning it, the effect of preventing drowsy driving is insufficient because the warning is performed at the time when eye closure has already occurred.

As another example, there is a device that detects a lane departure based on a lane detecting camera and a steering state of a steering wheel by a driver to determine drowsy driving and warns the driver of it.

In addition, in the case of a device for determining drowsy driving by detecting a lane departure and warning of the lane departure, the device determines the drowsy driving based on a lane departure warning device. The device detects a forward road image from a camera attached to the vehicle, to determine the currently running lane and outputs a warning when the vehicle departs from the lane. However, since the device outputs a warning at the time when the vehicle has already departed from a lane, it is also difficult to prevent drowsy driving.

SUMMARY

The present disclosure is provided to solve the above-mentioned problems occurring in the prior art while advantages achieved by the prior art are maintained.

An aspect of the present disclosure provides an apparatus, a system and a method for managing drowsy driving, which are capable of preventing drowsy driving and improving driving concentration by determining a drowsiness state of a driver and warning the driver of drowsiness.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for managing drowsy driving includes a communication device that transmits vehicle information to a server and receives a drowsiness probability of a driver from the server, and a controller that generates a command when the drowsiness probability of the driver exceeds a reference value and determines whether the driver is in a drowsy state based on input information of the driver responding to the command.

The drowsiness probability of the driver may be calculated based on the vehicle information and a drowsiness probability previously calculated.

The previously calculated drowsiness probability may be calculated by using data learned based on vehicle information at a time point of drowsiness, which is transmitted from other vehicle to the server.

The command may include a command for inducing the driver to operate a switch provided in a vehicle according to an arbitrary number of operations and an arbitrary operation sequence.

The controller may determine that the driver is in the drowsy state when the input information of the driver responding to the command does not exist, output a warning, and generate an additional command.

The controller may determine that the input information of the driver responding to the command is an input error when the input information of the driver responding to the command does not correspond to the command, and generate an additional command.

The controller may determine that the driver is in the drowsy state when the input error is repeated a specified number of times.

When the controller determines that the driver is in the drowsy state, the controller may be configured to output a warning sound, to output a warning sound and to open a window of the vehicle, or decelerate and stop the vehicle.

The controller may be configured to output the warning sound, output the warning sound and to open the window, or sequentially perform operations of decelerating and stopping the vehicle, as the number of times of a determined drowsy state increases.

According to another aspect of the present disclosure, a system for managing drowsy driving includes other vehicle that collects vehicle information at a time point of drowsiness and transmits the vehicle information collected at the time point of drowsiness to a server, a server that calculates a drowsiness probability by using data learned based on the vehicle information at the time point of the drowsiness, which is received from the other vehicle and calculates a drowsiness probability of a driver at a current time point by using vehicle information at the current time point, which is received from a subject vehicle, and the subject vehicle that collects the vehicle information at the current time point, transmits the vehicle information to the server, generates a command when the drowsiness probability of the driver at the current time point exceeds a reference value, determines whether the driver is in a drowsy state based on input information of the driver responding to the command, and outputs a warning.

According to still another aspect of the present disclosure, a method of managing drowsy driving includes transmitting vehicle information to a server, receiving a drowsiness probability of a driver from the server, generating a command when the drowsiness probability exceeds a reference value, and determining whether the driver is in a drowsy state based on input information of the driver responding to the command.

The drowsiness probability of the driver may be calculated based on the vehicle information and a drowsiness probability previously calculated.

The previously calculated drowsiness probability may be calculated by using data learned based on vehicle information at a time point of drowsiness, which is transmitted from other vehicle to the server.

The command may include a command for inducing the driver to operate a switch provided in a vehicle according to an arbitrary number of operations and an arbitrary operation sequence.

The determining of the drowsy state of the driver may include determining that the driver is in the drowsy state when the input information of the driver responding to the command does not exist.

The determining of the drowsy state of the driver may include determining that the input information of the driver responding to the command is an input error when the input information of the driver responding to the command does not correspond to the command, and generating an additional command.

The method may further include determining that the driver is in the drowsy state when the input error is repeated a specified number of times.

The method may further include outputting a warning after determining of the drowsy state of the driver based on the input information of the driver responding to the command.

The outputting of the warning may include outputting a warning sound, outputting the warning sound and opening a window of the vehicle, or decelerating and stopping the vehicle.

The method may further include outputting the warning sound, controlling to output the warning sound and open the window, or controlling to sequentially perform operations of decelerating and stopping the vehicle, as the number of times of a determined drowsy state increases.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
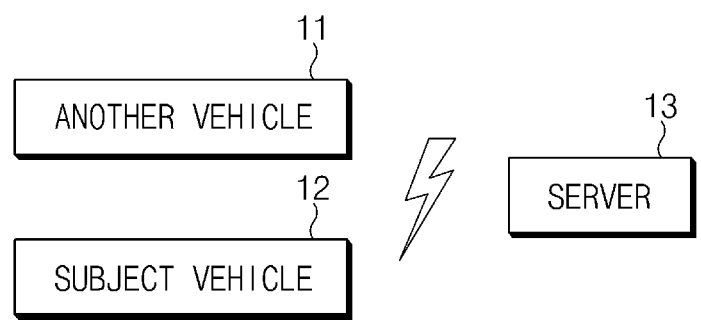
FIG. 1 is a block diagram illustrating a system for managing drowsy driving according to an embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the present disclosure, terms like first, second, "A", "B", (a), and (b) may be used. These terms are intended solely to distinguish one component from another, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a system for managing drowsy driving according to an embodiment of the present disclosure.

As shown in FIG. 1, a system for managing drowsy driving may include other vehicle 11, a subject vehicle 12, and a server 13.

The other vehicle 11 may be a vehicle that is provided with a device for detecting the drowsiness of a driver and collects drowsiness information of a driver.

The device for detecting the drowsiness of a driver may collect drowsiness information of a driver by using a camera and a sensor provided in a vehicle, and may directly detect the drowsiness of the driver based on the collected drowsiness information. The device for detecting the drowsiness of a driver may determine a time point of a driver. A conventional scheme may be used for detecting drowsiness of a driver.

The other vehicle 11 may collect vehicle information at the time when drowsiness is detected.

According to an embodiment, the vehicle information collected at the time when the drowsiness is detected may include information about a vehicle location, information about a driving environment, information about driving time, driver information, information about weather and humidity, season information, information about an internal temperature of a vehicle, information about an amount of carbon dioxide, information about an intensity of illumination of an outside, information about whether passengers are present, and information about a degree of indoor noise. However, the vehicle information is not limited to the above-described embodiments, and may include various factors that may affect the drowsiness driving of a driver.

The other vehicle 11 may collect vehicle information by using a camera, a sensor, a navigation device, and the like provided in the vehicle, and may receive vehicle information from the server for collection.

The other vehicle 11 may transmit the vehicle information collected at the time when drowsiness is detected to the server 13.

The subject vehicle 12 may include a vehicle not equipped with a device for detecting drowsiness of a driver. Therefore, it may be difficult for the subject vehicle 12 to directly detect the drowsiness of a driver.

The subject vehicle 12 may collect vehicle information at a current time. In this embodiment, the current time may mean a time point to determine a drowsy state.

According to an embodiment, the vehicle information may include information about a vehicle location, information about a driving environment, information about driving time, driver information, information about weather and humidity, season information, information about an internal temperature of a vehicle, information about an amount of carbon dioxide, information about an intensity of illumination of an outside, speed information, information about whether passengers are present, information about a degree of indoor noise, and personal information of a driver. However, the vehicle information is not limited to the above-described examples, and may include various elements that may affect the identity and the drowsy driving of a driver.

The subject vehicle 12 may transmit the vehicle information collected at the current time to the server 13.

The subject vehicle 12 may receive a drowsiness probability of the driver at the current time from the server 13.

The subject vehicle 12 may generate a command when the drowsiness probability at the current time exceeds a reference value. The subject vehicle 12 may determine that the driver is in a drowsy state based on the information which is input by the driver in response to the command and may output a warning.

The server 13 may receive the vehicle information collected at the time when drowsiness is detected from the other vehicle 11 and the vehicle information collected at the current time from the subject vehicle 12.

The server 13 can calculate the drowsiness probability using the learned data based on the vehicle information collected at the time when the drowsiness is detected.

The server 13 may calculate the drowsiness probability of the driver at the current time by using the vehicle information collected at the current time based on the drowsiness probability calculated previously.

The server 13 may transmit the drowsiness probability information at the current time to the subject vehicle 12.

Figure 2:
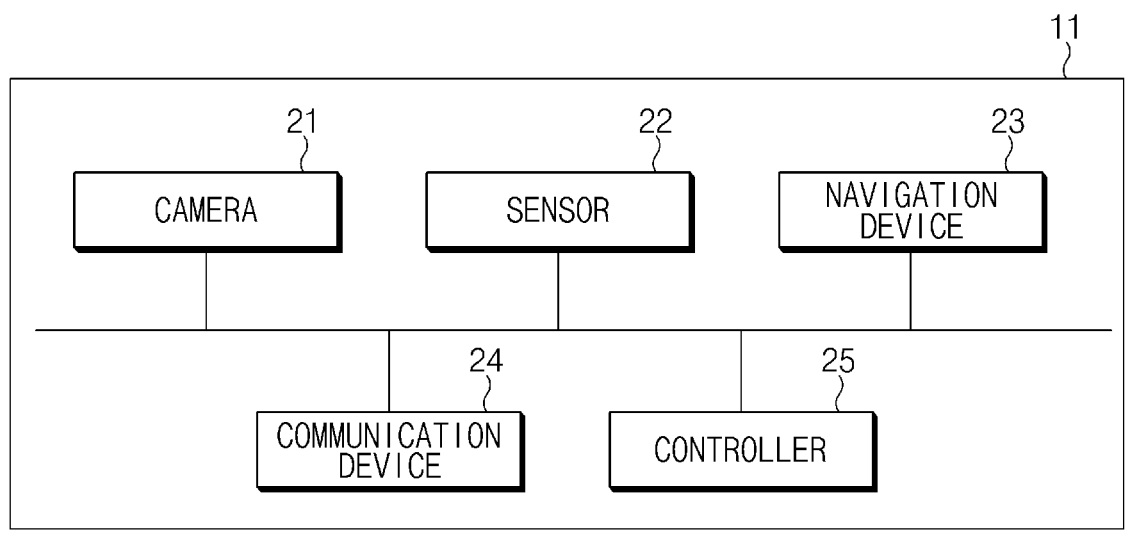
FIG. 2 is a block diagram illustrating other vehicle according to an embodiment of the present disclosure.

FIG. 2 is a block diagram illustrating other vehicle according to an embodiment of the present disclosure.

As shown in FIG. 2, the other vehicle 11 according to an embodiment may include a camera 21, a sensor 22, a navigation device 23, a communication device 24, and a controller 25.

The camera 21 may be provided inside the vehicle to obtain the driver information. In this case, the driver information may include drowsiness information of the driver, and the drowsiness information may include an eye-closed state of the driver, a gaze direction, and the like.

In addition, the camera 21 may take photographs in front of the vehicle while the vehicle is traveling. In further detail, the camera 21 may obtain information about a lane in front of the vehicle, an obstacle around the vehicle, and a traveling environment (a highway, a country road, a downtown).

The camera 21 may include a CCD camera for the purpose of checking a blind spot of a driver through a monitor, a CMOS camera for the purpose of recognizing an image such as lane detection, and an infrared camera for the purpose of securing sight or detecting a pedestrian at night in a near-infrared or far-infrared scheme, and may be applied suitably to a situation.

The sensor 22 may obtain the driver information. In this case, the driver information may include drowsiness information of a driver, and the drowsiness information may include the eye-closed state of a driver, a gaze direction, and the like.

The sensor 22 may sense a view in front of the vehicle while the vehicle is traveling such that the sensor 22 obtains information about a lane in front of the vehicle, an obstacle around the vehicle, and a traveling environment.

For example, the sensor 22 may be a distance sensor (e.g., a radar sensor or rider sensor) for obtaining lane information, a speed sensor for sensing a vehicle speed, a dual auto temperature control (DATC) sensor for sensing an internal temperature of the vehicle, a carbon dioxide measuring sensor for measuring an amount of carbon dioxide in the vehicle, an illumination sensor for sensing the brightness an outside of the vehicle, an occupant detection system (ODS) sensor for sensing the boarding of the passenger, and the like.

However, the sensor 22 is not limited to the above-described embodiment, and may include sensors capable of obtaining the drowsiness information of a driver or the vehicle information.

The navigation device 23 may provide the vehicle location information, the surrounding environment information, and the vehicle information.

In further detail, the navigation device 23 may be equipped with a global positioning system (GPS) receiver to receive the current location of the vehicle and provide map image information, route guidance image information, route guidance audio information, speed information of the vehicle, and destination information based on the current location of the vehicle.

To this end, the navigation device 23 may include a display for displaying information on the road on which the vehicle is traveling or a route to a destination that the driver desires to reach, a microphone for receiving internal noise of the vehicle and a command of the driver, and a speaker for outputting a sound. In recent years, the navigation device 23 is installed in a vehicle as an audio video navigation (AVN) device integrated with an audio device and a video device.

The microphone and the speaker may be included in the navigation device 23, but the embodiment is not limited thereto and may be mounted separately in the vehicle.

The communication device 24 may transmit the vehicle information to the server 13 at the time when the drowsiness is detected. For example, the communication device 24 may wirelessly communicate with the server 13.

The wireless communication may be performed through various wireless communication schemes such as via a radio data system-traffic message channel (RDSTMC), digital multimedia broadcasting (DMB), Wi-Fi, wireless broadband, a global system for mobile communication (GSM), code division multiple access (CDMA), wideband code division multiple access (WCDMA), a universal mobile telecommunications system (UMTS), time division multiple access (TDMA), long term evolution (LTE), and the like.

The controller 25 may determine the time point when the drowsiness is detected based on the information obtained from the camera 21, the sensor 22 and the navigation device 23, and execute instructions to transmit the vehicle information to the server 13 at the time point when the drowsiness is detected. The server 13 may also receive the vehicle information when the controller 25 detects the drowsiness.

For example, the controller 25 may provide information concerning whether the vehicle travels on a highway, a rural road, or a downtown area at the time point when the drowsiness is detected based on the obtained travel environment for transmission to the server 13, and may provide a continuous driving time at the time point when the drowsiness is detected based on a time for which the operation of a vehicle engine continues and a time for which the vehicle continues traveling at a specified speed or higher to be transmitted to the server 13.

In addition, the controller 25 may provide the driver information at the time point when the drowsiness is detected for transmission to the server 13 by using in-vehicle application connection information, portable terminal interlocking information, and fingerprint recognition information.

In addition, the controller 25 may receive information from the server based on the current location and transmit the weather and humidity at the time point when the drowsiness is detected to the server 13.

In addition, the controller 25 may transmit the season at the time point when the drowsiness is detected to the server 13 by using the time information of the vehicle based on the current date.

In addition, the controller 25 may provide an internal temperature of the vehicle at the time point when the drowsiness is detected by using DATC for transmission the server 13, and may provide an amount of carbon dioxide at the time point when the drowsiness is detected by using a carbon dioxide measuring sensor for transmission to the server 13.

In addition, the controller 25 may provide an external illumination at the time point when the drowsiness is detected by using the vehicle illumination sensor for transmission to the server 13, and may provide the vehicle speed at the time point when the drowsiness is detected by using the vehicle speed sensor for transmission to the server 13.

In addition, the controller 25 may provide information concerning whether a passenger is present at the time point when drowsiness is detected for transmission to the server 13 through an occupant detection system (ODS), and may provide a level of indoor noise at the time point when the drowsiness is detected for transmission to the server 13 through the microphone.

Figure 3:
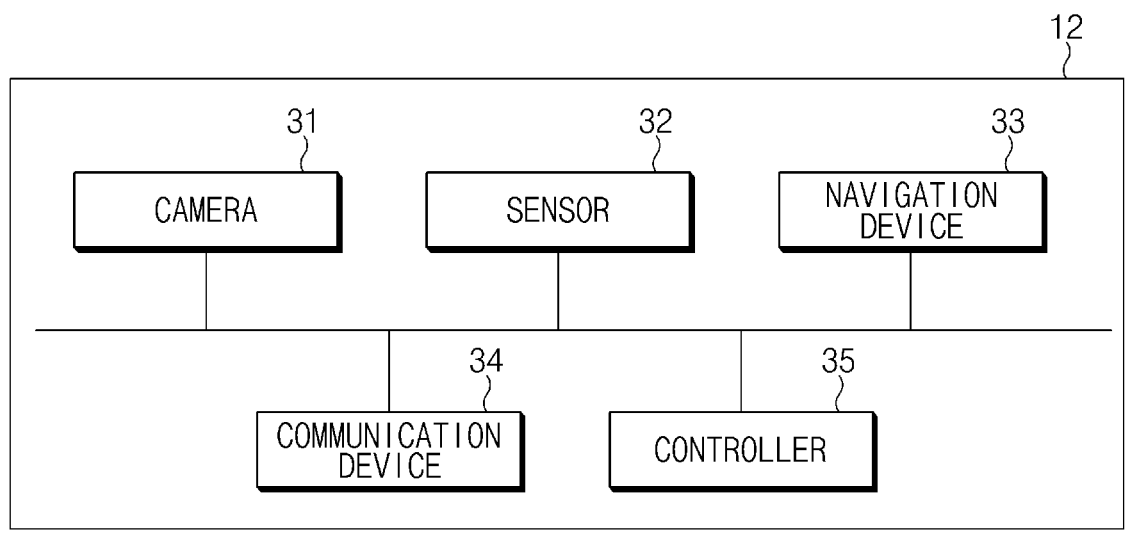
FIG. 3 is a block diagram illustrating an apparatus for managing drowsy driving according to an embodiment of the present disclosure.

FIG. 3 is a block diagram illustrating an apparatus for managing drowsy driving according to an embodiment of the present disclosure.

As shown in FIG. 3, an apparatus for managing drowsy driving according to an embodiment of the present disclosure may be provided in the subject vehicle 12, and the apparatus for managing drowsy driving may include a camera 31, a sensor 32, a navigation device 33, a communication device 34, and a controller 35.

The subject vehicle 12 may include a vehicle not equipped with a device for detecting the drowsiness of a driver. Thus, the camera 31 and the sensor 32 provided in the subject vehicle 12 cannot directly acquire information about the drowsiness of a driver. The camera 31 and the sensor 32 may obtain the vehicle information only at the current time point.

The camera 31 may photograph the front of the vehicle while the vehicle is running, and more specifically, acquire information about the lane ahead of the vehicle, the obstacle around the vehicle, or the traveling environment (e.g., highway, country road, or downtown).

The camera 31 may include a CCD camera for the purpose of checking a blind spot of a driver through a monitor, a CMOS camera for the purpose of recognizing an image such as lane detection, and an infrared camera for the purpose of securing sight or detecting a pedestrian at night in a near-infrared or far-infrared scheme, and may be applied suitably to a situation.

The sensor 32 may sense a view in front of the vehicle while the vehicle is traveling, such that the sensor 22 obtains information about a lane in front of the vehicle, an obstacle around the vehicle, and a traveling environment.

For example, the sensor 32 may be a distance sensor (e.g., a radar sensor or rider sensor) for obtaining lane information, a speed sensor for sensing a vehicle speed, a dual auto temperature control (DATC) sensor for sensing an internal temperature of the vehicle, a carbon dioxide measuring sensor for measuring an amount of carbon dioxide in the vehicle, an illumination sensor for sensing the brightness of an outside of the vehicle, an occupant detection system (ODS) sensor for sensing the boarding of the passenger, and the like.

The navigation device 33 may provide the vehicle location information, the surrounding environment information, and the vehicle information.

In further detail, the navigation device 33 may be equipped with a GPS receiver to receive the current location of the vehicle and provide map image information, route guidance image information, route guidance audio information, speed information of the vehicle, and destination information based on the current location of the vehicle.

To this end, the navigation device 33 may include a display for displaying information on the road on which the vehicle is traveling or a route to a destination that the driver desires to reach, a microphone for receiving internal noise of the vehicle and a command of the driver, and a speaker for outputting a sound. The navigation device 33 may be installed in a vehicle as an audio video navigation (AVN) device integrated with an audio device and a video device.

The microphone and the speaker may be included in the navigation device 33, but the embodiments are not limited thereto and may alternatively be mounted separately in the vehicle.

The communication device 34 may transmit the information obtained from the camera 31, the sensor 32 and the navigation device 33 to the server 13 and may receive drowsiness probability information at the current time point, which is calculated from the server 13. For example, the communication device 34 may wirelessly communicate with the server 13.

The wireless communication may be performed through various wireless communication schemes such as via a radio data system-traffic message channel (RDSTMC), digital multimedia broadcasting (DMB), Wi-Fi, wireless broadband, a global system for mobile communication (GSM), code division multiple access (CDMA), wideband code division multiple access (WCDMA), a universal mobile telecommunications system (UMTS), time division multiple access (TDMA), long term evolution (LTE), and the like.

The controller 35 may allow vehicle information at the current time point to be transmitted to the server 13 based on the information obtained from the camera 31, the sensor 32, and the navigation device 33. The controller 35 may receive the vehicle information at the current time point from the server 13.

For example, the controller 35 may provide information concerning whether the vehicle travels on a highway, a rural road, or a downtown area at the time point when the drowsiness is detected based on the obtained travel environment for transmission to the server 13, and may provide a continuous driving time at the time point when the drowsiness is detected based on a time for which the operation of a vehicle engine continues and a time for which the vehicle continues traveling at a specified speed or higher for transmission to the server 13.

In addition, the controller 35 may provide the driver information at the time point when the drowsiness is detected for transmission to the server 13 by using in-vehicle application connection information, portable terminal interlocking information, and fingerprint recognition information.

In addition, the controller 35 may receive information from the server based on the current location and transmit the weather and humidity at the time point when the drowsiness is detected to the server 13.

In addition, the controller 35 may transmit the season at the time point when the drowsiness is detected to the server 13, using the time information of the vehicle based on the current date.

In addition, the controller 35 may provide an internal temperature of the vehicle at the time point when the drowsiness is detected by using DATC for transmission the server 13, and may provide an amount of carbon dioxide at the time point when the drowsiness is detected by using a carbon dioxide measuring sensor for transmission to the server 13.

In addition, the controller 35 may provide an external illumination at the time point when the drowsiness is detected by using the vehicle illumination sensor for transmission to the server 13, and may provide the vehicle speed at the time point when the drowsiness is detected by using the vehicle speed sensor to be transmitted to the server 13.

In addition, the controller 35 may provide information concerning whether a passenger is present at the time point when drowsiness is detected for transmission to the server 13 through an occupant detection system (ODS), and may provide a level of indoor noise at the time point when the drowsiness is detected for transmission to the server 13 through the microphone.

The controller 35 may determine whether the drowsiness probability of the driver at the current time point received from the server 13 exceeds a reference value, and may generate a command when it is determined that the drowsiness probability exceeds the reference value.

However, when the controller 35 determines that the vehicle is travelling on a curved road or slowly driven (e.g., the vehicle speed is less than 30 km/h) even if the drowsiness probability at the current time point exceeds the reference value, the controller 35 may execute instructions to prohibit a command from being generated.

The command generated by the controller 35 may include a command to induce the driver to operate a switch provided in the vehicle according to an arbitrary number of operations and an operation sequence. For example, the command may include a command to operate a volume control switch of a steering wheel two times upwardly and then to operate the volume control switch of the steering wheel one time downwardly.

The controller 35 may generate a command when the drowsiness probability at the current time point exceeds the reference value, and may execute instructions that the switch not operate in response to the input information when there is input information in response to the generated command.

That is, as described above, when the command to induce the driver to operate the volume control switch of the steering wheel two times upwardly and one time downwardly is generated and then, there is an input of the driver in response thereto, the controller does not increase the volume by two levels or down by one level.

The controller 35 may determine the input information of the driver responding to the generated command.

When the controller 35 determines that the input information of the driver responding to the generated command does not exist for a specified time, the controller 35 may determine that the driver is in a drowsy state at the current time point.

When the input information of the driver responding to the generated command exists for the specified time, but does not correspond to the command, the controller may determine that the input information is an input error and generate an additional command.

The controller 35 may determine that the driver is in a drowsy state when the input error is repeated a specified number of times (e.g., three times).

When the controller 35 determines that the driver is in a drowsy state, the controller 35 may generate an additional command after outputting a warning sound. In addition, when the controller 35 determines a drowsy state again after generating the additional command, the controller 35 may output different warnings based on the number of drowsiness determinations.

For example, the controller 35 may execute instructions to output a warning sound when it is determined that the driver is in a drowsy state.

When the controller 35 twice determines that the driver is in a drowsy state, the controller 35 may execute instructions to output a warning sound and open a window.

When the controller 35 determines for a third time that the driver is in a drowsy state, the controller 35 may execute instructions to decelerate and stop the vehicle.

Figure 4:
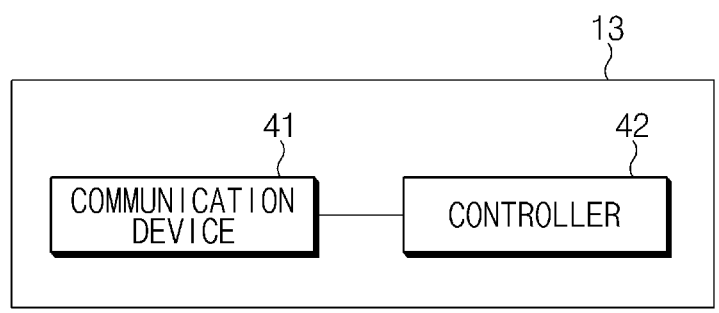
FIG. 4 is a block diagram illustrating a server according to an embodiment of the present disclosure.

FIG. 4 is a block diagram illustrating a server according to an embodiment of the present disclosure.

As shown in FIG. 4, the server 13 according to an embodiment of the present disclosure may include a communication device 41 and a controller 42.

The communication device 41 may communicate with the other vehicle 11 and the subject vehicle 12. The communication device 41 may wirelessly communicate with the other vehicle 11 and the subject vehicle 12.

The communication device 41 may receive the drowsiness information of the driver obtained through the camera 21, the sensor 22 and the navigation device 23 and the vehicle information at the time point when the drowsiness is detected from the other vehicle 11.

The communication device 41 may receive the vehicle information obtained through the camera 31, the sensor 32, and the navigation device 33 at the current time point from the subject vehicle 12.

The controller 42 may learn to calculate the drowsiness probability based on the drowsiness information of the driver received from the other vehicle 11 and the vehicle information at the time point when the drowsiness is detected.

That is, the controller 42 may calculate the probability that the driver is in a drowsy state at the current time point by using the data learned based on the vehicle information collected at the time point when the drowsiness is detected. The details will be described with reference to FIG. 5.

Figure 5:
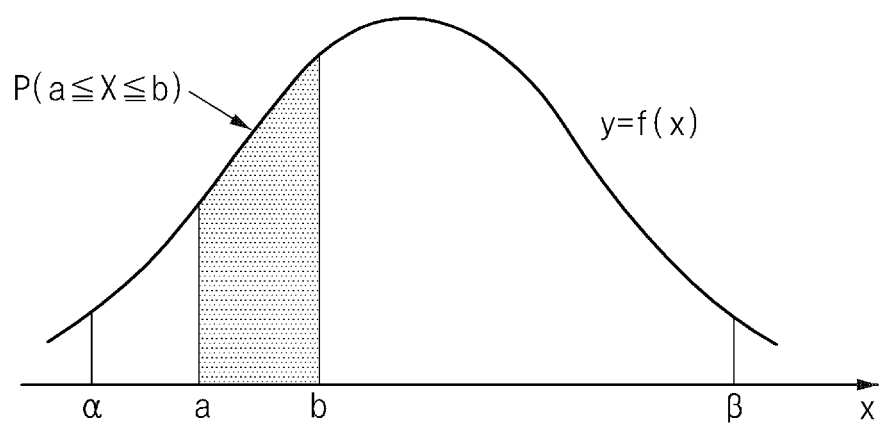
FIG. 5 is a graph illustrating a drowsiness probability calculation scheme of a server according to an embodiment of the present disclosure.

FIG. 5 is a graph illustrating a drowsiness probability calculation scheme of a server according to an embodiment of the present disclosure.

The controller 42 may calculate a probability distribution after collecting and learning the vehicle information at the time point when the drowsiness is detected. The probability distribution may be calculated by using the probability density function expressed as following Equation 1, wherein the graph showing the probability density function is shown in FIG. 5.

$$P(a \leq x \leq b) = \int_a^b f(x)dx \qquad \text{[Equation 1]}$$

In FIG. 5, when 'α' is 0, 'β' is 24 o'clock, and the sleeping time is 3:00 am, the random variable may be set to '3'. Assuming that the range of the random variable is before 3:10 and after 3:10, the 'a' is set to (3−0.1) and the 'b' is set to (3+0.1).

Therefore, the controller 42 may calculate the drowsiness probability from before 3:10 am to after 3:10 am in the range of 2.9 to 3.1 for the probability density function f (x) of FIG. 5.

The controller 42 may calculate the drowsiness probability at the current time point by weighting the drowsiness probability calculated based on at least one piece of vehicle information at the time point when the drowsiness is detected.

In one example embodiment, seven pieces of vehicle information are collected based on the drowsiness time point, and the drowsiness probability at the current time point calculated based on the vehicle information may be expressed as shown in Equations 2 and 3.

$$P(x_1, x_2, \ldots, x_7) = \alpha_1 P_1(x_1) + \alpha_2 P_2(x_2) + \ldots + \alpha_7 P_7(x_7)$$

$$P(x_1, x_2, \ldots, x_7) = \alpha_1 P_1(x_1) + \alpha_2 P_2(x_2) + \ldots + \alpha_7 P_7(x_7) \quad \text{[Equation 2]}$$

$$P(x_1, x_2, \ldots, x_7) = \alpha_1 \int_{a_1}^{b_1} f_1(x_1) + \alpha_2 \int_{a_2}^{b_2} f_2(x_2) + \ldots + \alpha_7 \int_{a_7}^{b_7} f_7(x_7)$$

$$P(x_1, x_2, \ldots, x_7) = \alpha_1 \int_{a_1}^{b_1} f_1(x_1) + \alpha_2 \int_{a_2}^{b_2} f_2(x_2) + \ldots + \alpha_7 \int_{a_7}^{b_7} f_7(x_7) \quad \text{[Equation 3]}$$

Where $\alpha_1, \alpha_2, \ldots, \alpha_7$ mean weights, and the sum of $\alpha_1$ to $\alpha_7$ is 1. When calculated with the same weight, all the weights may have a value of $1/7$.

According to an embodiment, the weight may have a larger value as the priority of the vehicle information affecting drowsiness driving is higher.

The controller 42 may set the priority affecting the drowsy driving of a driver as shown in Table 1.

TABLE 1

| Ranking | Vehicle information |
|---------|---------------------|
| 1 | Season, weather, humidity |
| 2 | Continuous driving time |
| 3 | Vehicle internal temperature, amount of carbon dioxide |
| 4 | Vehicle external illumination |
| 5 | Driving environment |
| 6 | Presence/absence of passenger, vehicle internal noise |
| 7 | Driver information |

Figure 6:
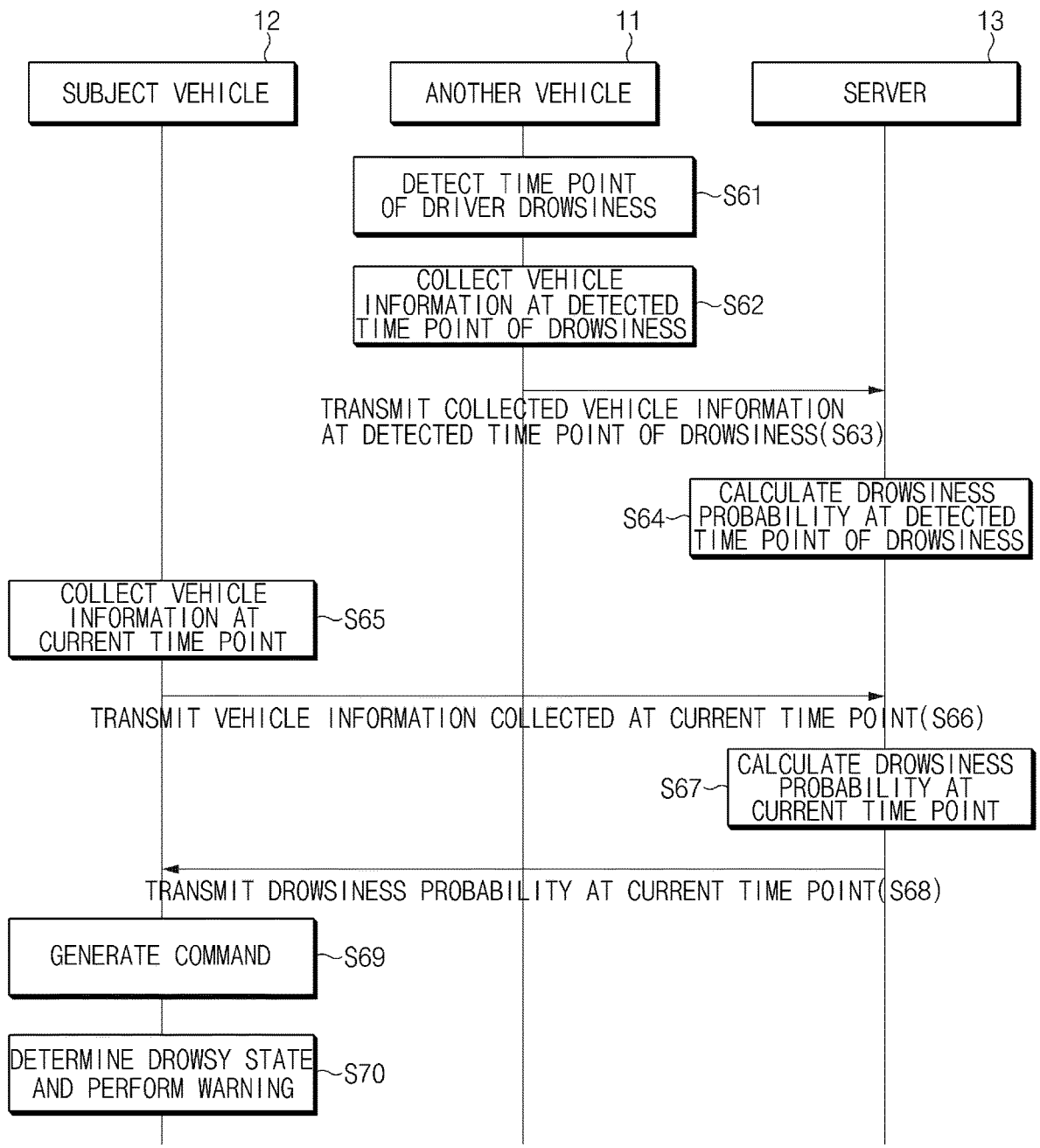
FIG. 6 is a flowchart illustrating a method of managing drowsy driving according to an embodiment of the present disclosure.

FIG. 6 is a flowchart illustrating a method of calculating a drowsiness probability at the time point of drowsiness according to an embodiment of the present disclosure.

As shown in FIG. 6, in operation S61, the other vehicle 11 collects driver drowsiness information and detects a time point of driver drowsiness.

In operation S62, the other vehicle 11 collects vehicle information and detect a time point of drowsiness.

In operation S63, the other vehicle 11 transmits the vehicle information collected at the detected time point of drowsiness to the server 13.

In operation S64, the server 13 calculates the drowsiness probability at the time point of drowsiness received from the other vehicle 11.

In operation S65, the subject vehicle 12 collects the vehicle information at the current time point.

In operation S66, the subject vehicle 12 transmits the vehicle information collected at the current time point to the server 13.

For the detailed descriptions of operations S61 to S66, refer to the description of FIG. 2.

In operation S67, the server 13 calculates the drowsiness probability at the current time point based on the drowsiness probability calculated at the time point of drowsiness.

In operation S68, the server 13 transmits the calculated drowsiness probability at the current time point to the subject vehicle 12.

For the detailed descriptions of operations S67 and S68, refer to the description of FIG. 4.

In operation S69, the subject vehicle 12 generates a command when the drowsiness probability at the current time point exceeds the reference value. The command in operation S69 may include a command to allow the driver to operate the switch provided in the vehicle according to the number of times of switch operations and the operation sequence.

In operation S70, the subject vehicle 12 determines the input information of the driver responding to the command generated in operation S69, and determines that the driver is in a drowsy state based on the determined input information of the driver, thereby outputting a warning.

For the detailed descriptions of operations S69 and S70, refer to the description of FIG. 3.

Figure 7:
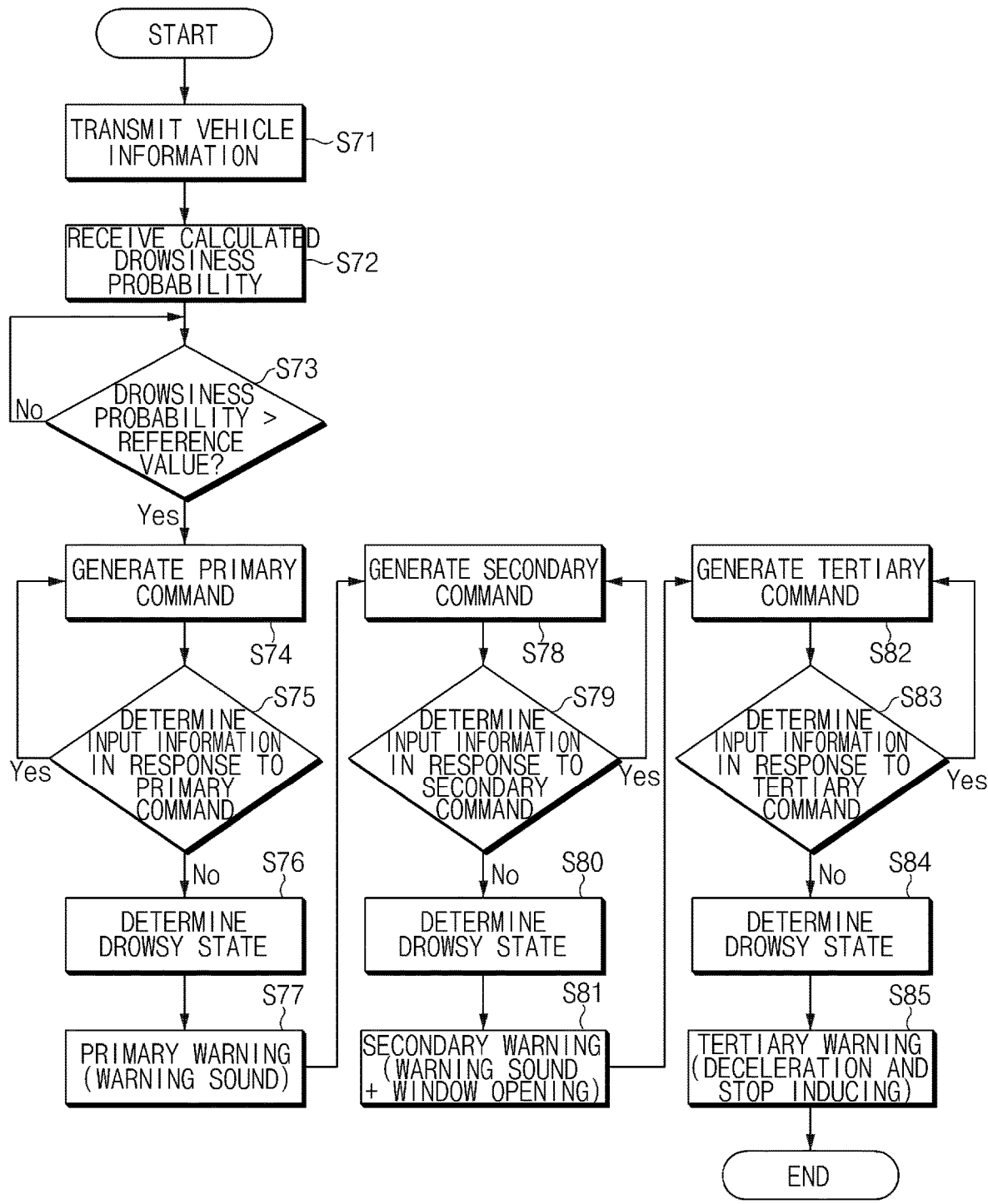
FIG. 7 is a detailed flowchart illustrating a method of managing drowsy driving according to an embodiment of the present disclosure.

FIG. 7 is a detailed flowchart illustrating a method of managing drowsy driving according to an embodiment of the present disclosure.

As shown in FIG. 7, in operation S71, the subject vehicle 12 transmits the collected vehicle information at the current time point to the server 13. For a more detailed description of S71, refer to the description of FIG. 3.

In operation S72, the subject vehicle 12 receives the calculated drowsiness probability at the current time point from the server 13.

In operation S73, the subject vehicle 12 determines whether the drowsiness probability at the current time point exceeds a reference value.

In operation S74, when it is determined in operation S73 that the drowsiness probability at the current time point exceeds the reference value (e.g., 80%) (Y), the subject vehicle 12 generates a primary command.

When it is determined in operation 73 that the vehicle travels on a curved road or is driven slowly (e.g. a vehicle speed less than 30 km/h) even if the drowsiness probability at the current time point exceeds the reference value, the subject vehicle does not generate the command.

When it is determined in operation S73 that the drowsiness probability at the current time point does not exceed the reference value (N), the subject vehicle 12 may wait for operation without generating a command until the drowsiness probability exceeds the reference value.

The primary command generated in S74 may include a command to induce the driver to operate a switch provided in the vehicle according to an arbitrary number of operations and an operation sequence. For example, the primary command may include a command to operate a volume control switch of a steering wheel two times upwardly and then to operate the volume control switch of the steering wheel one time downwardly.

In operation S75, the subject vehicle 12 determines the input information of the driver responding to the primary command.

When it is determined in operation S75 that the input information of the driver responding to the primary command does not exist for a specified time (N), in operation S76, the subject vehicle 12 may determine that the driver is in a drowsy state at the current time point.

When the input information of the driver responding to the generated command exists for the specified time (Y), but does not correspond to the command in operation S74, in operation S75, the subject vehicle 12 may determine that the input information is an input error and generate an additional command. The additional command is generated in operation S74. In this case, it may be determined that the driver is in a drowsy state when the input error is repeated a specified number of times (e.g., three times).

When there is input information in response to the generated command in operation S75, the subject vehicle 12 may execute instructions to prevent the switch from operating in response to the input information.

That is, in operation S75, when the command to induce the driver to operate the volume control switch of the steering wheel two times upwardly and one time downwardly is generated and then, there is an input of the driver in response thereto in operation S74, the volume may be prevented from being increased by two levels or downed by one level.

When it is determined in operation S76 that the driver is in a drowsy state, the subject vehicle 12 outputs a primary warning in operation S77. The primary warning may include an audible alarm output through the speaker.

In operation S78, the subject vehicle 12 generates a secondary command when the primary warning is output.

The secondary command generated in operation S78 may include a command to induce the driver to operate the switch provided in the vehicle according to an arbitrary number of operations and an arbitrary operation sequence. For example, the secondary command may include a command to operate a cruise control switch of a steering wheel one time downwardly and then to operate the cruise control switch of the steering wheel one time upwardly.

In operation S79, the subject vehicle 12 determines the input information of the driver responding to the secondary command.

When it is determined in operation S79 that the input information of the driver responding to the secondary command does not exist for an arbitrary time (N), in operation S80, the subject vehicle 12 determines that the driver is in a drowsy state at the current time point.

When the input information of the driver responding to the generated command exists for the arbitrary time (Y) but does not correspond to the command in operation S78, in operation S79 the subject vehicle 12 may determine that the input information is an input error and generate an additional command. The additional command is generated in operation S78. In this case, when the input error is repeated the specified number of times (three times), it may be determined that the driver is in a drowsy state.

When there is input information in response to the generated command in S79, the subject vehicle 12 may control the switch to not operate in response to the input information.

That is, in operation S79, after a command to induce the driver to operate the volume control switch of the steering wheel one time downwardly and one time upwardly is generated, when there is a driver input in response to the command, the speed may be prevented from being lowered or increased.

When it is determined in operation S80 that the driver is in a drowsy state, the subject vehicle 12 enables a secondary warning to be output in operation S81. The secondary warning may include outputting a warning sound and controlling to open the window.

In operation S82, the subject vehicle 12 generates a tertiary command when the secondary warning is output.

The tertiary command generated in operation S82 may include a command to induce the driver to operate the switch provided in the vehicle according to an arbitrary number of operations and an arbitrary operation sequence. For example, the tertiary command may include operating the volume control switch of the steering wheel three times downwardly after operating the volume control switch of the steering wheel two times upwardly.

In operation S83, the subject vehicle 12 may determine the input information of the driver responding to the tertiary command.

When it is determined in operation S83 that the input information of the driver responding to the tertiary command does not exist for a specified time (Y), the subject vehicle 12 may determine that the driver is in a drowsy state at the current time point in operation S84.

When the input information of the driver responding to the generated command exists for the specified time (Y), but does not correspond to the command in operation S83, the subject vehicle 12 may determine that the input information is an input error and generate an additional command. The additional command is generated in operation S82. In this case, when the input error is repeated the specified number of times (three times), it may be determined that the driver is in a drowsy state.

When there is input information in response to the generated command in S83, the subject vehicle 12 may control the switch not to operate in response to the input information.

For example, in operation S83, after a command to induce the driver to operate the volume control switch of the steering wheel two times upwards and three times downwards is generated, when there is a driver input in response to the command, the volume may be prevented from being increased or decreased.

When it is determined in operation S84 that the driver is in a drowsy state, the subject vehicle 12 enables a tertiary warning to be output in operation S85. The tertiary warning may include controlling to decelerate and stop the vehicle.

Figure 8:
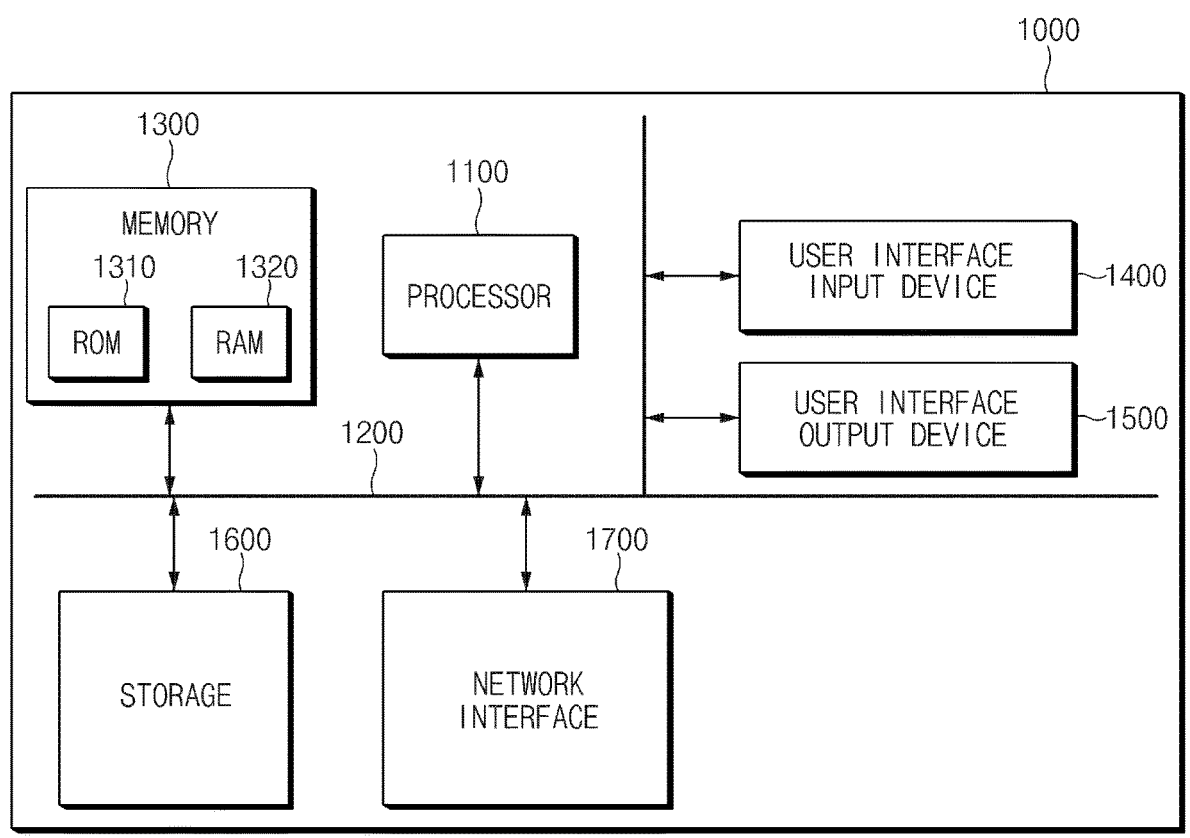
FIG. 8 is a block diagram illustrating a computer system according to an embodiment of the present disclosure.

FIG. 8 is a block diagram illustrating a computer system according to an embodiment of the present disclosure.

Referring to FIG. 8, a computing system 1000 may include at least one processor 1100, a memory 1300, a user interface input device 1400, a user interface output device 1500, storage 1600, and a network interface 1700, which are connected to each other through a bus 1200.

The processor 1100 may be a central processing unit (CPU) or a semiconductor device which performs processing for instructions stored in the memory device 1300 and/or the storage 1600. The memory 1300 and the storage 1600 may include various types of volatile or non-volatile storage media. For example, the memory 1300 may include a read only memory (ROM) and a random access memory (RAM).

The operations of a method or algorithm described in connection with the embodiments disclosed herein may be embodied directly in hardware, in a software module executed by the processor 1100, or in a combination of the two. The software module may reside in a storage medium (that is, the memory 1300 and/or the storage 1600) such as a random access memory (RAM), a flash memory, a read only memory (ROM), an erasable programmable ROM (EPROM), an electrically erasable programmable ROM (EEPROM), registers, hard disk, a removable disk, a compact disc-ROM (CD-ROM), etc. An exemplary storage medium is coupled to the processor 1100 such that the processor 1100 may read information from, and write information to, the storage medium. Alternatively, the storage medium may be integrated into the processor 1100. The processor and the storage medium may reside in an ASIC. The ASIC may reside within a user terminal. Alternatively, the processor and the storage medium may reside in the user terminal as individual components.

According to the apparatus, system and method for managing drowsy driving of the embodiments, when it is determined that a driver is drowsy, it is possible to prevent drowsy driving without increasing an additional cost by inducing a command to be executed, thereby improving the driving concentration.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. An apparatus for managing drowsy driving, the apparatus comprising:
    a communication device configured to transmit vehicle information to a server and receive a drowsiness probability of a driver from the server; and
    a controller configured to generate a command when the drowsiness probability of the driver exceeds a reference value and to determine whether the driver is in a drowsy state based on input information of the driver responding to the command.

2. The apparatus of claim 1, wherein the drowsiness probability of the driver is calculated based on the vehicle information and a previously calculated drowsiness probability.

3. The apparatus of claim 2, wherein the previously calculated drowsiness probability is calculated using data learned based on vehicle information at a time point of drowsiness, which is transmitted from other vehicle to the server.

4. The apparatus of claim 1, wherein the command includes a command for inducing the driver to operate a switch provided in a vehicle according to an arbitrary number of operations and an arbitrary operation sequence.

5. The apparatus of claim 1, wherein the controller is configured to determine that the driver is in the drowsy state when the input information of the driver responding to the command does not exist, to output a warning, and to generate an additional command.

6. The apparatus of claim 1, wherein the controller is configured to determine that the input information of the driver responding to the command is an input error when the input information of the driver responding to the command does not correspond to the command, and to generate an additional command.

7. The apparatus of claim 6, wherein the controller is configured to determine that the driver is in the drowsy state when the input error is repeated a specified number of times.

8. The apparatus of claim 1, wherein when the controller determines that the driver is in the drowsy state, the controller is configured to execute instructions to output a warning sound, to output the warning sound and to open a window of a vehicle, or to decelerate and stop the vehicle.

9. The apparatus of claim 1, wherein the controller is configured to execute instructions to output a warning sound, to output the warning sound and to open a window, or to sequentially perform operations of decelerating and stopping the vehicle, as a number of times of determining the drowsy state increases.

10. A system for managing drowsy driving, the system comprising:
    other vehicle configured to collect vehicle information at a time point of drowsiness and transmit the vehicle information collected at the time point of the drowsiness to a server;
    a server configured to calculate a drowsiness probability by using data learned based on the vehicle information at the time point of the drowsiness, which is received from the other vehicle and calculate a drowsiness probability of a driver at a current time point by using vehicle information at the current time point, which is received from a subject vehicle; and
    the subject vehicle configured to collect the vehicle information at the current time point, transmit the vehicle information to the server, generate a command when the drowsiness probability of the driver at the current time point exceeds a reference value, determine whether the driver is in a drowsy state based on input information of the driver responding to the command, and output a warning.

11. A method of managing drowsy driving, the method comprising:
    transmitting vehicle information to a server;
    receiving a drowsiness probability of a driver from the server;
    generating a command when the drowsiness probability exceeds a reference value; and
    determining whether the driver is in a drowsy state based on input information of the driver responding to the command.

12. The method of claim 11, wherein the drowsiness probability of the driver is calculated based on the vehicle information and a previously calculated drowsiness probability.

13. The method of claim 12, wherein the previously calculated drowsiness probability is calculated using data learned based on vehicle information at a time point of drowsiness, which is transmitted from other vehicle to the server.

14. The method of claim 11, wherein the command includes a command for inducing the driver to operate a switch provided in a vehicle according to an arbitrary number of operations and an arbitrary operation sequence.

15. The method of claim 11, wherein the determining of the drowsy state of the driver includes determining that the driver is in the drowsy state when the input information of the driver responding to the command does not exist.

16. The method of claim 11, wherein the determining of the drowsy state of the driver includes determining that the input information of the driver responding to the command is an input error when the input information of the driver responding to the command does not correspond to the command, and generating an additional command.

17. The method of claim 16, further comprising:
    determining that the driver is in the drowsy state when the input error is repeated a specified number of times.

18. The method of claim 11, further comprising:
    outputting a warning after the determining of the drowsy state of the driver based on the input information of the driver responding to the command.

19. The method of claim 18, wherein the outputting of the warning includes outputting a warning sound, outputting the warning sound and opening a window of a vehicle, or decelerating and stopping the vehicle.

20. The method of claim 19, further comprising:
outputting the warning sound, controlling to output the warning sound and open the window, or controlling to sequentially perform operations of decelerating and stopping the vehicle, as the number of times of determining the drowsy state increases.

* * * * *